United States Patent Office 3,522,881
Patented Aug. 4, 1970

3,522,881
APPARATUS FOR THE TREATMENT OF SEWAGE AND LIKE INDUSTRIAL WASTE
James B. Nicol, Glasgow, Scotland, assignor to Drysdale & Company Limited, Glasgow, Scotland, a company incorporated of the United Kingdom of Great Britain and Northern Ireland
Filed Jan. 27, 1969, Ser. No. 793,998
Claims priority, application Great Britain, Jan. 25, 1968, 3,903/68
Int. Cl. C02c 5/04
U.S. Cl. 210—127                      7 Claims

ABSTRACT OF THE DISCLOSURE

A sewage-treatment plant comprising two sections, each having a chamber for receiving sewage and an aerating means. An airlift conveys sewage from the first section to the second section. The second section further includes an outlet valve and a volume determining means, the latter means controlling the operation of the airlift conveyor, and through a timing means, the operation of the outlet valve and the second section aerating means.

---

Figure 1:
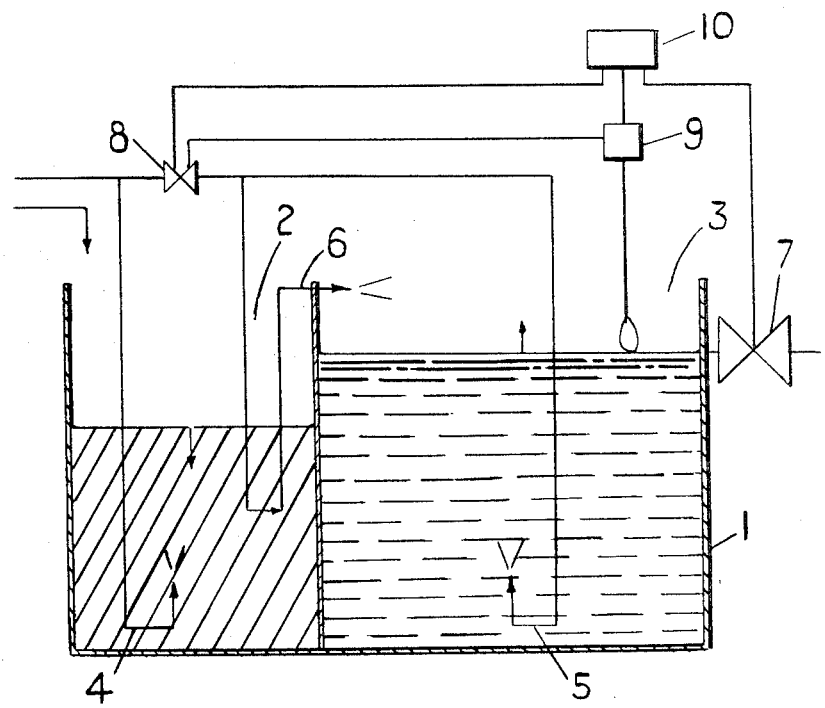

This invention relates to the treatment of sewage and like industrial waste and is a modification of the invention which is the subject of our prior Pat. No. 3,366,242.

The specification of the said prior patent describes and claims a sewage-treatment plant including a sewage-receiving section incorporating at least one chamber arranged to receive untreated liquiform sewage, means for aerating sewage in the sewage-receiving section, a second section incorporating at least one chamber for continuing the treatment of the sewage to the final fully-treated stage, an air lift constituting the sole means for transferring liquid from the first mentioned section to the second section, and outlet means by which fully treated effluent may leave the second section.

The plant which is the subject of the prior patent is extremely effective in operation but it operates on the continuous throughout principle, i.e., sewage is constantly added and effluent is drawn away, and to provide proper operation of the plant a certain degree of supervision is required particularly to ensure that sludge and scum are properly returned for retreatment. Under certain conditions also gas is evolved in the sludge in the settling section and while this is normally quite acceptable there are situations where the evolution of gas would be undesirable. It is an object of the present modification to provide a construction which requires the minimum of attention from an operator and in which the conditions can be so arranged that no gas is evolved and the problem of returning sludge and scum do not arise.

A sewage plant according to the present modification includes a sewage-receiving section incorporating at least one chamber arranged to receive untreated liquiform sewage, means for aerating sewage in the sewage-receiving section, a second section incorporating at least one chamber for continuing the treatment of sewage to the final fully-treated stage, means for aerating sewage in said second section, and airlift means constituting the sole means for transferring liquid from the first mentioned section to the second section, outlet means including an outlet valve by which fully treated effluent may leave the second section, means for controlling the supply of operating air to the airlift and to the aerating means of the second section, a volume-determining means in the second section arranged when the volume of liquid in the section reaches a certain predetermined figure to be operative to close the air supply means to the air lift and to the aerating means in the second section and also to set in operation a timing means which is operative to cause the outlet valve to be opened after a predetermined interval of time and after a further predetermined interval of time to cause the outlet valve to be closed and the supply of operating air to the airlift and to the aerating means in the second section to be resumed.

The timing means may be a single time clock programmed to perform its valve opening and closing operations at predetermined intervals after it is set in operation by the volume-determining means, or it may be two separate clocks the first of which is arranged to be set in operation by the volume-determining means so that it is effective to open the outlet valve and at the same time to set in operation a second time clock which is effective after a further interval of time to close the outlet valve and reinstate the supply of air to the airlift and to the aeraing means in the second section.

The means controlling the supply of operating air to the airlift and to the aerating means may be a valve in a line from an air compressor or may be a switch controlling operation of the air compressor so that the air compressor is switched off when the air supply is to be discontinued and is switched on when the air supply is required.

The volume-determining means may be a switch operated by a float or may be a probe projecting towards the surface of the liquid and effective when the liquid surface reaches a certain level to close an electrical contact or to close an air outlet pipe causing a rise in pressure in the outlet pipe which latter is in communication with pressure-sensitive means controlling the air supply means. The volume-determining means may include means for projecting a beam of light towards the surface of the liquid, the beam being intercepted or reflected by the surface of the liquid when the surface reaches a particular level whereby to actuate a light-sensitive device. In yet another construction the volume-determining means may include a time switch set from the known rate of influx of liquid through the airlift to operate after an interval of time corresponding with the introduction of a predetermined volume of liquid into the second section. Alternatively the volume-determining means may be a flow meter operated by the passage of liquid through the air lift.

The timing means may be adjustable so that the periods of time after which valving operations occur may be varied as desired.

Figure 2:
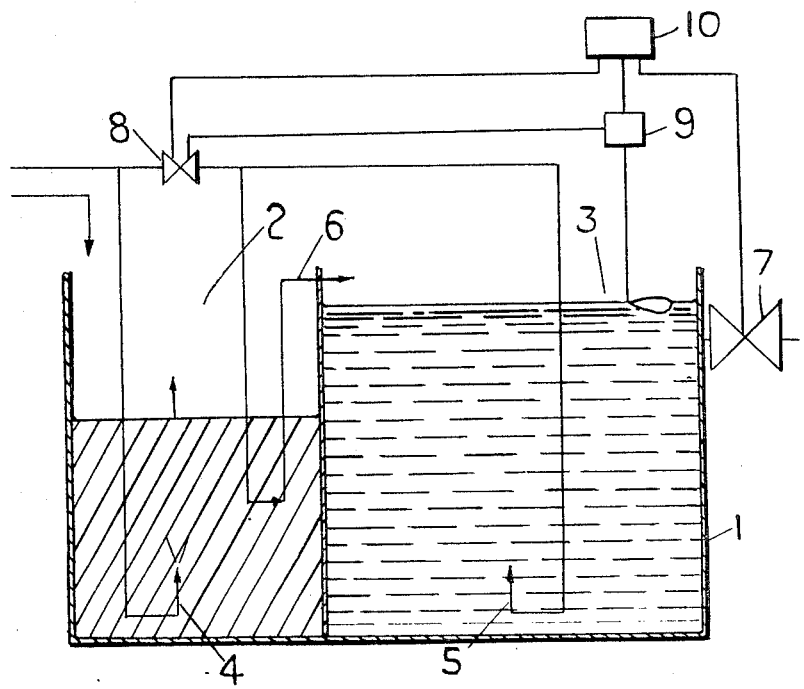
Figure 3:
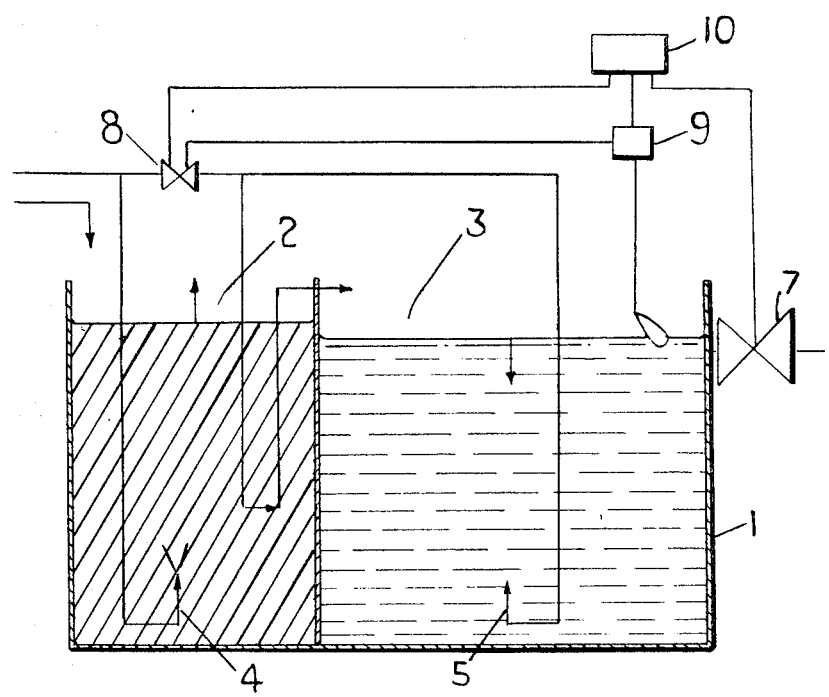

A practical embodiment of the invention is illustrated in the accompanying diagrammatic drawings in which FIGS. 1, 2 and 3 are longitudinal sections through the same plant at three different stages in a sewage treatment cycle.

In the drawings, 1 denotes a tank incorporating a chamber 2 constituting a sewage-receiving section arranged to receive untreated liquiform sewage and 3 denotes a chamber constituting a second section for receiving liquid from the chamber 2 and continuing treatment of the sewage to the final fully-treated stage, 4 denotes air nozzles constituting means for introducing air into the sewage-receiving section 2, 5 denotes nozzles for introducing air into the second section 3, 6 denotes airlift means constituting the sole means for transferring liquid from the sewage-receiving section 2 to the second section 3, and 7 denotes an outlet valve arranged to control the outlet of treated effluent from the chamber 3. 8 denotes a valve for controlling the supply of air to the airlift 6 and the air introducing means 5 in the second section 3. 9 denotes a volume-determining means in the second section 3 constituted by a float-operated switch, and 10 denotes a timing means. The float switch 9 is operatively connected to the valve 8 to be capable of closing the valve 8 and is also operatively connected to the timing means 10 to set the timing means 10 in operation. The timing means 10 is arranged to be operable to open the valve 7 after a predetermined interval of time, and after a further predetermined interval of time to close the valve 7 and open the valve 8, the intervals of time being measured from the instant when the float switch 9 sets the timing means in operation.

In practice, sewage flows into the chamber 2 constituting the sewage-receiving section and as soon as the valve 8 supplying air to the airlift 6 is opened sewage is transferred into the chamber 3 constituting the second section. As aerating air is being supplied to both sections the sewage is being aerated all this time and treatment of sewage is taking place. When the liquid surface rises to the predetermined level in the second section 3 the volume-determining means 9 operates to close the valve 8 and shut off the supply of air to the airlift 6 and to the aerating means 5 in the second section and also sets the timing means 10 in operation. When the airlift 6 stops operating, the transfer of sewage from the sewage-receiving section 2 to the second section 3 ceases and since the air supply to the aerating means 5 in the sceond section 3 is shut off the liquid in this section becomes quiescent and settling takes place. After the predetermined interval of time found necessary to provide the required degree of settling the timing means 10 opens the outlet valve 7 and treated effluent runs off the surface of the second section 3. After the further predetermined interval during which discharge of effluent from the second section 3 has taken place and the level in the section consequently lowered the timing means 10 closes the outlet valve 7 and again opens the valve 8 whereby to reestablish the supply of air to the airlift 6 and to the aerating means 5 in the second section. While settling was taking place in the second section 3 the depleted sewage-receiving section 2 was filling with incoming sewage and a second batch of liquid is now transferred by the airlift 6 into the second section 3 and the cycle of operations is repeated.

This plant provides completely constant conditions of operation irrespective of the rate of introduction of sewage. There is no return of sludge or scum to the sewage-receiving section 2 and consequently no question of sludge or scum flowing along the surface of the effluent where it might find its way towards the outlet. All the sludge in the plant is aerated during each complete cycle and gassing problems have been consequently eliminated since all sludge is completely aerated during each cycle. Settling takes place under completely immobile conditions since the aerating means 5 in the second section 3 is shut off while settling is taking place. All matter in suspension can thus precipitate without hindrance leaving the upper zone of liquid completely clear of contamination. Because of the control of the operation by the timing means 10 the only supervision required is to see that the various valves are in fact functioning without there being any necessity to interfere in any way with how they are functioning.

Because of the very effective separation of solid matter from the effluent a certain accumulation of sludge takes place in the second section 3 and this has to be removed from time to time.

What is claimed is:
1. A sewage-treatment plant including a sewage-receiving section incorporating at least one chamber arranged to receive untreated liquiform sewage, means for aerating sewage in the sewage-receiving section, a second section incorporating at least one chamber for continuing the treatment of sewage to the final fully-treated stage, means for aerating sewage in said second section, airlift means constituting the sole means for transferring liquid from the first mentioned section to the second section, outlet means including an outlet valve by which fully treated effluent may leave the second section, means for controlling the supply of operating air to the airlift and to the aerating means of the second section, a volume-determining means in the second section arranged when the volume of liquid in the section reaches a certain predetermined figure to be operative to close the air supply means to the arilift and to the areating means in the second section, and a timing means arranged to be set in operation by the volume-determining means when the volume of liquid in the second section reaches the predetermined figure and operative to cause the outlet valve to be opened after a predetermined interval of time and after a further predetermined interval of time to cause the outlet valve to be closed and the supply of operating air to the airlift and to the aerating means in the second section to be resumed.

2. A plant as claimed in claim 1 in which the timing means is a clock device programmed to perform its valve opening and closing operations at predetermined intervals after it is set in operation by the volume-determining means.

3. A plant as claimed in claim 1 in which the means controlling supply of operating air to the airlift and to the aerating means is an air supply control valve.

4. A plant as claimed in claim 1 in which the volume-determining means is a float device.

5. A plant as claimed in claim 1 in which the volume-determining means is an open-ended air outlet pipe projecting downwardly with its open end lowermost and at a height such that the open end becomes submerged when the predetermined volume of liquid is in the second section whereby to cause the pressure to rise in the air-outlet pipe, said pressure rise being operative to close the air supply means to the airlift and to the aerating means in the second section and to set the timing means in operation.

6. A plant as claimed in claim 1 in which the volume-determining means is a time switch set from the known rate of influx of liquid through the airlift to operate after an interval of time corresponding with the introduction of a predetermined quantity of liquid into the second section.

7. A plant as claimed in claim 1 in which the volume-determining means is a flow meter operated by the passage of liquid through the airlift.

References Cited

UNITED STATES PATENTS

| | | | |
|---|---|---|---|
| 2,144,386 | 1/1939 | Nordell | 210—139 |
| 2,154,132 | 4/1939 | Mallory | 210—134 X |
| 2,243,826 | 5/1941 | Neilsen et al. | 210—139 X |
| 3,342,727 | 9/1967 | Bringle | 210—220 X |
| 3,355,019 | 11/1967 | Mitchell | 210—139 X |
| 3,382,981 | 5/1968 | Hampton | 210—220 X |

FOREIGN PATENTS 154,103  11/1953  Australia.

JAMES L. DECESARE, Primary Examiner

U.S. Cl. X.R.
210—134, 139, 220